(12) United States Patent
Qiu (10) Patent No.: US 12,373,561 B2
(45) Date of Patent: Jul. 29, 2025

(54) MONITORING AND CONTROL METHOD, CIRCUIT, AND DEVICE FOR ON-BOARD TRUSTED PLATFORM

(71) Applicant: INSPUR SUZHOU INTELLIGENT TECHNOLOGY CO., LTD., Jiangsu (CN)

(72) Inventor: LianXing Qiu, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 236 days.

(21) Appl. No.: 17/796,115

(22) PCT Filed: Feb. 19, 2021

(86) PCT No.: PCT/CN2021/076841
§ 371 (c)(1),
(2) Date: Jul. 28, 2022

(87) PCT Pub. No.: WO2021/248934
PCT Pub. Date: Dec. 16, 2021

(65) Prior Publication Data
US 2023/0121492 A1  Apr. 20, 2023

(30) Foreign Application Priority Data

Jun. 10, 2020 (CN) .......................... 202010524680.2

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC ...... G06F 21/44; G06F 21/572; G06F 21/575; G06F 21/85; G06F 2221/033
See application file for complete search history.

(56) References Cited

U.S. PATENT DOCUMENTS

| 2005/0091496 A1* | 4/2005 | Hyser | G06F 21/575 |
| | | | 713/175 |
| 2006/0107328 A1* | 5/2006 | Frank | G06Q 20/341 |
| | | | 726/26 |

(Continued)

FOREIGN PATENT DOCUMENTS

| CN | 109583212 A | * | 4/2019 | ........... G06F 21/575 |
| CN | 109670319 A | * | 4/2019 | ........... G06F 21/572 |

(Continued)

OTHER PUBLICATIONS

Chen, Zhanliang et al. CN 110163012 A (machine translation). Published Aug. 23, 2019. (Year: 2019).*

(Continued)

*Primary Examiner* — Michael Simitoski
(74) *Attorney, Agent, or Firm* — Cooper Legal Group, LLC (57) ABSTRACT

A monitoring and control method includes: connecting, by a first Multiplexer (MUX), a logic element and a Baseboard Management Controller (BMC) to a BMC serial storage module storing a BMC code, and connecting, by a second MUX, the logic element and a Platform Controller Hub (PCH) to a Basic Input Output System (BIOS) serial storage module storing a BIOS code; when the logic element obtains power-on operation information, and performing a credibility detection on the BMC code and the BIOS code; if the BMC code passes the detection, controlling, by the logic element, the first MUX to connect the BMC to the BMC serial storage module; if the BIOS code passes the detection, controlling, by the logic element, the second MUX to connect the PCH to the BIOS serial storage module; and by the logic element, controlling the PCH to be powered and the BMC to enter a working state.

15 Claims, 3 Drawing Sheets

(56) References Cited

U.S. PATENT DOCUMENTS

| | | | | |
|---|---|---|---|---|
| 2014/0108786 | A1* | 4/2014 | Kreft | G06Q 20/3825 |
| | | | | 713/194 |
| 2014/0129818 | A1* | 5/2014 | Li | G06F 9/4403 |
| | | | | 713/2 |
| 2016/0342798 | A1* | 11/2016 | Smith | G06F 21/74 |
| 2018/0165455 | A1* | 6/2018 | Liguori | G06F 21/57 |
| 2020/0042710 | A1* | 2/2020 | Liu | G06F 21/575 |
| 2020/0119929 | A1* | 4/2020 | Edwards | H04L 9/3265 |
| 2020/0193029 | A1* | 6/2020 | Liu | H04L 9/3234 |
| 2020/0250313 | A1* | 8/2020 | Li | G06F 11/1004 |
| 2021/0240646 | A1* | 8/2021 | Robertson | G06F 9/4406 |
| 2021/0334378 | A1* | 10/2021 | Kennedy | G06F 21/575 |
| 2022/0067162 | A1* | 3/2022 | Jeansonne | G06F 21/572 |

FOREIGN PATENT DOCUMENTS

| | | | | |
|---|---|---|---|---|
| CN | 110073355 | A * | 7/2019 | G06F 21/44 |
| CN | 110109715 | A * | 8/2019 | G06F 21/57 |
| CN | 110163012 | A * | 8/2019 | |
| CN | 110197070 | A | 9/2019 | |
| CN | 110298174 | A * | 10/2019 | |
| CN | 110377346 | A | 10/2019 | |
| CN | 111046392 | A | 4/2020 | |
| CN | 111399919 | A * | 7/2020 | |
| CN | 111723376 | A | 9/2020 | |
| WO | WO-2020063001 | A1 * | 4/2020 | G06F 21/575 |

OTHER PUBLICATIONS

Li, Jianjian et al. CN 110298174 A (machine translation). Published Oct. 1, 2019. (Year: 2019).*
Sun, Yujun et al. CN 110109715 A (machine translation). Published Aug. 9, 2019. (Year: 2019).*
Zhao, Weitao. CN 109583212 A (machine translation). Published Apr. 5, 2019. (Year: 2019).*
Corresponding Chinese Patent Application No. 202010524680.2, Second Office Action, dated Sep. 6, 2022.
Corresponding Chinese Patent Application No. 202010524680.2, Decision of Rejection, dated Jan. 13, 2023.
International Search Report cited in PCT application PCT/CN2021/076841, mailed May 25, 2021, 5 pages.
Written Opinion cited in PCT application PCT/CN2021/076841, mailed May 25, 2021, 9 pages.
First Office Action of corresponding CN priority application CN202010524680.2, mailed Jun. 22, 2022, 14 pages.

* cited by examiner

MONITORING AND CONTROL METHOD, CIRCUIT, AND DEVICE FOR ON-BOARD TRUSTED PLATFORM

This application claims priority to Chinese Patent Application No. 202010524680.2, filed on Jun. 10, 2020, in China National Intellectual Property Administration and entitled "Monitoring and Control Method, Circuit, and Device for On-board Trusted Platform", the contents of which are hereby incorporated by reference in its entirety.

FIELD

The present disclosure relates to the technical field of servers, and more particularly to a monitoring and control method, a circuit, and a device for an on-board trusted platform.

BACKGROUND

With the development of cloud computing applications, information security is becoming increasingly important. A server whose system has been tampered with is vulnerable to attacks and has security risks. However, an existing credibility detection is implemented by an external module that needs to be purchased additionally by a customer, and is costly and inconvenient to apply. If the credibility detection is integrated into a board, an existing chip is configured to perform detection and control a server action, which has more advantages in cost and security.

Figure 1:
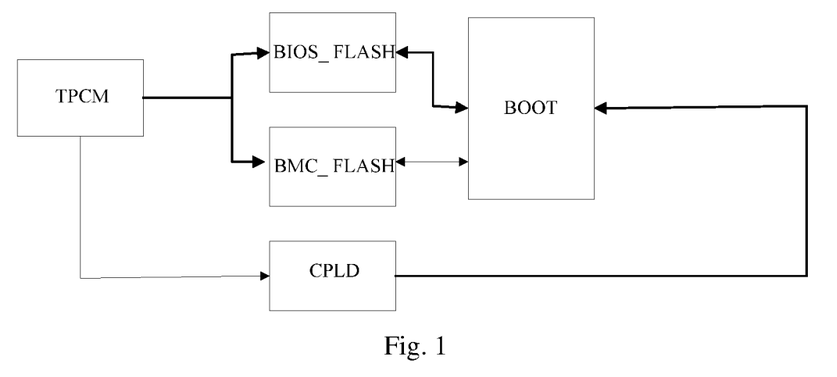
FIG. 1 is a schematic structural diagram of connection of circuit modules for server credibility detection and control in the prior art.
Figure 2:
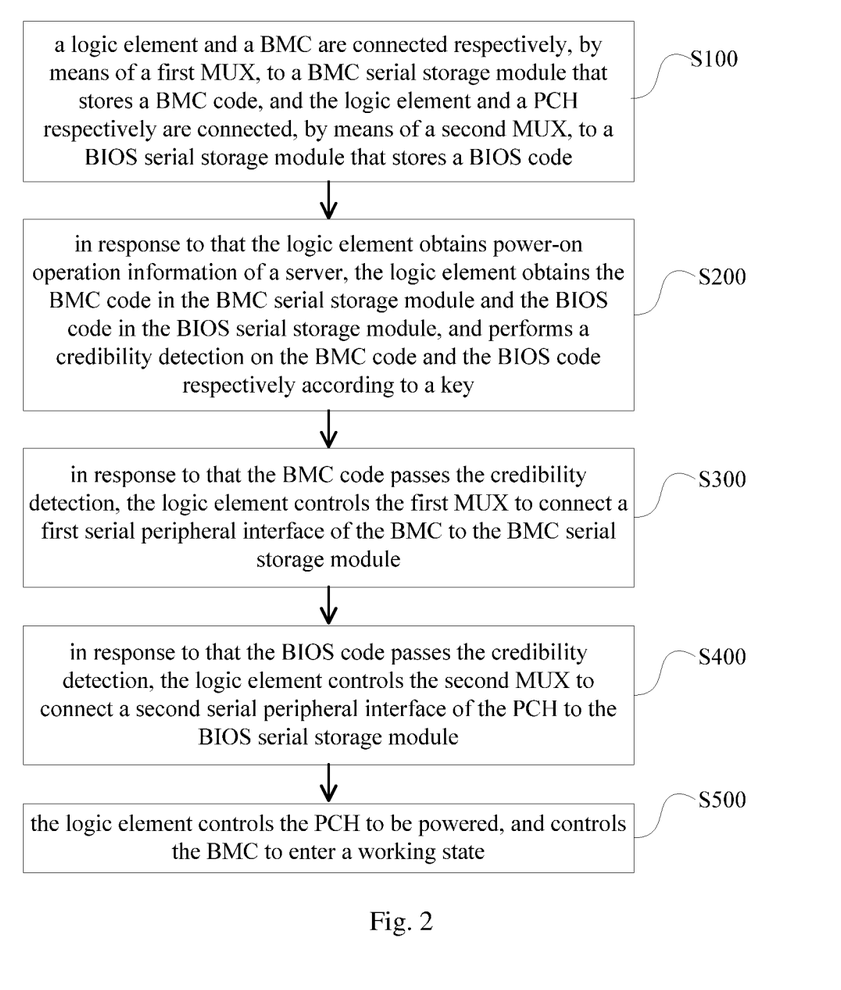
FIG. 2 is a schematic block diagram of an embodiment of a monitoring and control method for an on-board trusted platform according to the present disclosure.

FIG. 1 is a schematic structural diagram of connection of circuit modules for server credibility detection and control in the prior art. As shown in FIG. 1, a Trusted Platform Control Model (TPCM) completes a Serial Peripheral Interface (SPI) FLASH credibility detection, and notifies a Complex Programmable Logic Device (CPLD), and then the CPLD controls a subsequent boot operation, thereby preventing a Basic Input Output System (BIOS) code and a Baseboard Management Controller (BMC) code from being tampered with.

However, the TPCM should be equipped to perform the credibility detection, which is costly and inflexibly in secret key design.

SUMMARY

In view of this, an objective of embodiments of the present disclosure is to provide a detection and control design method for an on-board trusted platform. A credibility detection and control can be implemented based on a logic element, a BMC, and a Platform Controller Hub (PCH) without any TPCM, whereby a cost is reduced, and keys may be generated flexibly according to a product.

Based on the above objective, an aspect of the present disclosure provides the monitoring and control method for the on-board trusted platform, including:
connecting, by means of a first Multiplexer (MUX), a logic element and a BMC respectively to a BMC serial storage module that stores a BMC code, and connecting, by means of a second MUX, the logic element and a PCH respectively to a BIOS serial storage module that stores a BIOS code;
in response to that the logic element obtains power-on operation information of a server, by the logic element, obtaining the BMC code in the BMC serial storage module and the BIOS code in the BIOS serial storage module, and performing a credibility detection on the BMC code and the BIOS code respectively according to a key;
in response to that the BMC code passes the credibility detection, controlling, by the logic element, the first MUX to connect a first serial peripheral interface of the BMC to the BMC serial storage module;
in response to that the BIOS code passes the credibility detection, controlling, by the logic element, the second MUX to connect a second serial peripheral interface of the PCH to the BIOS serial storage module; and
controlling the PCH to be powered and the BMC to enter a working state by the logic element.

In some implementation modes of the monitoring and control method for the on-board trusted platform of the present disclosure, the controlling the PCH to be powered and the BMC to enter a working state by the logic element further includes:
connecting a RESET pin of the BMC to the logic element, and controlling, by the logic element, the RESET pin of the BMC to be released to make the BMC enter the working state.

In some implementation modes of the monitoring and control method for the on-board trusted platform of the present disclosure, the controlling the PCH to be powered and the BMC to enter a working state by the logic element further includes:
connecting a power supply enable pin of a power supply chip that powers the PCH to the logic element, and controlling, by the logic element, the power supply enable pin to power the PCH.

In some implementation modes of the monitoring and control method for the on-board trusted platform of the present disclosure, the performing a credibility detection on the BMC code and the BIOS code respectively according to a key further includes:
encrypting a plurality of pieces of preset BMC code information in the BMC code to form a BMC code public key, performing a decryption checking on the BMC code public key by means of a private key, and in response to the decryption checking being successful, determining that the BMC code passes the credibility detection; and
encrypting a plurality of pieces of preset BIOS code information in the BIOS code to form a BIOS code public key, performing the decryption checking on the BIOS code public key by means of a private key, and in response to the decryption checking being successful, determining that the BIOS code passes the credibility detection.

In some implementation modes of the monitoring and control method for the on-board trusted platform of the present disclosure, the method further includes:
in response to the BMC code or the BIOS code not passing the credibility detection, controlling the BMC not to enter the working state and the PCH not to be powered by the logic element, so as to stop a boot operation.

Another aspect of the embodiments of the present disclosure also provides a monitoring and control circuit for an on-board trusted platform, including:
a BMC, connected to the BMC serial storage module by means of the first MUX;
a PCH, connected to the BIOS serial storage module by means of the second MUX; and a logic element, connected to the BMC serial storage module by means of the first MUX and to the BIOS serial storage module by means of the second MUX.

wherein the logic element is configured to: in response to obtaining power-on operation information of a server, obtain the BMC code in the BMC serial storage module and the BIOS code in the BIOS serial storage module, and perform the credibility detection on the BMC code and the BIOS code respectively according to a key; in response to that the BMC code passes the credibility detection, connect a first serial peripheral interface of the BMC to the BMC serial storage module by means of the first MUX; in response to that the BIOS code passes the credibility detection, connect a second serial peripheral interface of the PCH to the BIOS serial storage module by means of the second MUX; and control the PCH to be powered and the BMC to enter the working state.

In some implementation modes of the platform monitoring and control circuit for the on-board trusted of the present disclosure, the controlling the PCH to be powered and the BMC to enter a working state further includes:

connecting the RESET pin of the BMC to the logic element, and controlling, by the logic element, the RESET pin of the BMC to be released to make the BMC enter the working state.

In some implementation modes of the monitoring and control circuit for the on-board trusted platform of the present disclosure, the controlling the PCH to be powered and the BMC to enter a working state further includes:

connecting the power supply enable pin of the power supply chip that powers the PCH to the logic element, and controlling, by the logic element, the power supply enable pin to power the PCH.

In some implementation modes of the monitoring and control circuit for the on-board trusted platform of the present disclosure, the logic element is further configured to:

in response to the logic element determining that the BMC code or the BIOS code does not pass the credibility detection, control the BMC not to enter the working state and the PCH not to be powered by the logic element, so as to stop a boot operation.

Another aspect of the embodiments of the present disclosure also provides a monitoring and control device for the on-board trusted platform, including:

a connecting module, configured to connect, by means of a first MUX, a logic element and a BMC respectively to a BMC serial storage module that stores a BMC code, and connect, by means of a second MUX, the logic element and a PCH respectively to a BIOS serial storage module that stores a BIOS code;

a detection module, configured to, in response to that the logic element obtains the power-on operation information of the server, obtain the BMC code in the BMC serial storage module and the BIOS code in the BIOS serial storage module by the logic element, and perform credibility detection on the BMC code and the BIOS code respectively according to a key by the logic element;

a BMC code trusted module, configured to, in response to that the BMC code passes the credibility detection, control, the first MUX to connect a first serial peripheral interface of the BMC to the BMC serial storage module by the logic element;

a BIOS code trusted module, configured to, in response to that the BIOS code passes the credibility detection, control, the second MUX to connect a second serial peripheral interface of the PCH to the BIOS serial storage module by the logic element; and an enable module, configured to control the PCH to be powered and the BMC to enter the working state by the logic element.

The present disclosure at least has the following beneficial technical effects: the cost of a TPCM module is eliminated, keys are generated more flexibly, and detection and control of the trusted platform may be implemented effectively on a board without any TPCM.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other embodiments according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first" and "second" in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Based on the above objective, a first aspect of the embodiments of the present disclosure discloses an embodiment of a monitoring and control method for an on-board trusted platform. FIG. 1 is a schematic block diagram of an embodiment of the monitoring and control method for the on-board trusted platform according to the present disclosure. In the embodiment shown in FIG. 1, the method at least includes the following steps:

In step S100, a logic element and a BMC are connected respectively, by means of a first MUX (Multiplexer), to a BMC serial storage module that stores a BMC code, and the logic element and a PCH respectively are connected, by means of a second MUX, to a BIOS serial storage module that stores a BIOS code.

In step S200, in response to that the logic element obtains power-on operation information of a server, the logic element obtains the BMC code in the BMC serial storage module and the BIOS code in the BIOS serial storage module, and performs a credibility detection on the BMC code and the BIOS code respectively according to a key.

In step S300, in response to that the BMC code passes the credibility detection, the logic element controls the first MUX to connect a first serial peripheral interface of the BMC to the BMC serial storage module.

In step S400, in response to that the BIOS code passes the credibility detection, the logic element controls the second MUX to connect a second serial peripheral interface of the PCH to the BIOS serial storage module.

In step S500, the logic element controls the PCH to be powered, and controls the BMC to enter a working state.

Figure 3:
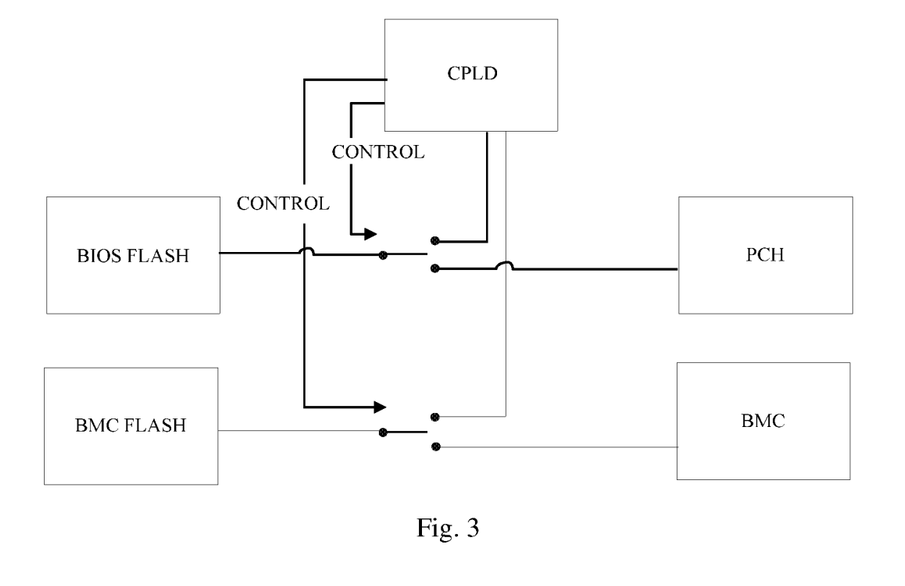
FIG. 3 is a schematic structural diagram of a circuit connection for a credibility detection in an embodiment of a monitoring and control method for an on-board trusted platform according to the present disclosure.
Figure 4:
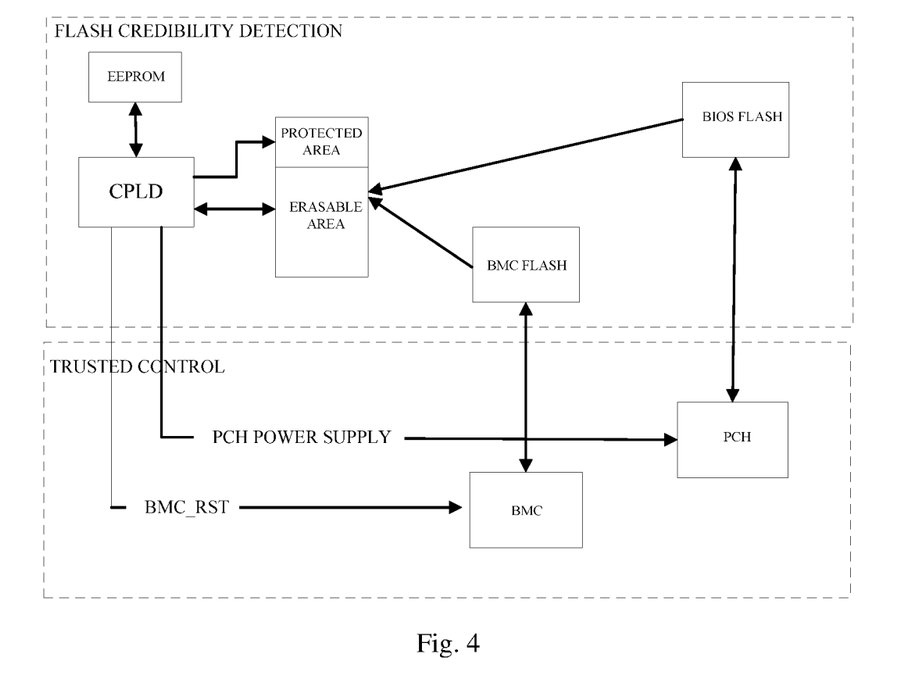
FIG. 4 is a schematic structural diagram of a credibility detection and control in an embodiment of a monitoring and control method for an on-board trusted platform according to the present disclosure.

In some embodiments of the present disclosure, FIG. 3 is a schematic structural diagram of circuit connection for the credibility detection in an embodiment of monitoring and control method for an on-board trusted platform according to the present disclosure. FIG. 4 is a schematic structural diagram of the credibility detection and control in an embodiment of the monitoring and control method for the on-board trusted platform according to the present disclosure. As shown in FIGS. 3 and 4, a key for the credibility detection is stored in an Electrically Erasable Programmable Read Only Memory (EEPROM) or a protected area of an SPI FLASH (Serial Peripheral Interface FLASH, that is serial storage module, wherein the protected area of the SPI FLASH may be set, and data in the set protected area is in a write-protected state and unmodifiable) for a logic element to read. In some embodiments of the present disclosure, the logic element is usually a CPLD (Complex Programmable Logic Device). The CPLD and a BMC (Baseboard Management Controller) are connected respectively, by means of a first MUX, to an SPI FLASH that stores a BMC code, and the CPLD has control over the first MUX. A working state of the BMC is controlled by the CPLD. Before the server is switched from a G3 state to S5, the CPLD may detect the BMC code in the BMC serial storage module. If the BMC code passes the credibility detection, the CPLD controls the first MUX to connect an SPI of the BMC to the BMC serial storage module that stores the BMC code to wait for booting.

Similarly, the CPLD and a PCH are connected respectively, by means of a second MUX, to a BIOS serial storage module that stores a BIOS code, and the CPLD has control over the second MUX. Whether to power the PCH is controlled by the CPLD. Before the server is switched from the G3 state to S5, the CPLD may detect the BIOS code in the BIOS serial storage module. If the BIOS code passes the credibility detection, the CPLD controls the second MUX to connect an SPI of the PCH to the BIOS serial storage module that stores the BIOS code to wait for booting.

After a successful credibility detection, the BMC serial storage module and the BIOS serial storage module have been switched to the BMC and the PCH respectively. According to power-on timing of the server, the CPLD controls the PCH to be powered and releases RESET of the BMC to make the BMC enter the working state respectively.

In the prior art that is yet not improved according to the implementation mode of the present disclosure, the key is usually stored in a TPCM, and the TPCM is needed to detect the storage module, and notifies the CPLD of a detection result.

After improvements are made according to the implementation mode of the present disclosure, the key may be stored in the EEPROM or SPI FLASH of a board, and credibility detection and control are completed by the CPLD. Therefore, connectors on the board are reduced by one, the TPCM is eliminated, the cost is reduced, and keys are generated more flexibly.

According to some implementation modes of the monitoring and control method for the on-board trusted platform of the present disclosure, the operation that the logic element controls the PCH to be powered and controls the BMC to enter a working state further includes that:

a RESET pin of the BMC is connected to the logic element, and the logic element controls the RESET pin of the BMC to be released to make the BMC enter the working state.

In some embodiments of the present disclosure, the RESET pin of the BMC is connected to the CPLD and controlled by the CPLD. Therefore, the CPLD may control the RESET pin of the BMC to control the BMC whether to enter the working state.

According to some implementation modes of the monitoring and control method for the on-board trusted platform of the present disclosure, the operation that the logic element controls the PCH to be powered and controls the BMC to enter a working state further includes that:

a power supply enable pin of a power supply chip that powers the PCH is connected to the logic element, and the logic element controls the power supply enable pin to power the PCH.

In some embodiments of the present disclosure, a Voltage Regulator (VR) may implement voltage conversion, power output control, and other functions, and an enable pin VR_EN of a chip thereof may control whether to output power. A VR enable pin VR_EN that powers the PCH is connected to the CPLD, such that a power supply of the PCH is completely controlled by the CPLD.

According to some implementation modes of the monitoring and control method for the on-board trusted platform of the present disclosure, the operation that the credibility detection is performed on the BMC code and the BIOS code respectively according to a key further includes that:

a plurality of pieces of preset BMC code information in the BMC code are encrypted to form a BMC code public key, a decryption checking is performed on the BMC code public key by means of a private key, and in response to the decryption checking being successful, it is determined that the BMC code passes the credibility detection; and a plurality of pieces of preset BIOS code information in the BIOS code are encrypted to form a BIOS code public key, the decryption checking is performed on the BIOS code public key by means of a private key, and in response to the decryption checking being successful, it is determined that the BIOS code passes the credibility detection.

In some embodiments of the present disclosure, the EEPROM is selected to store a private key, and write protection may be implemented by means hardware to prevent the key from being tampered with. Alternatively, the key may be stored in the protected area of the SPI FLASH to be prevented from being tampered with.

To generate a public key, some fixed rows of code information in the code are automatically encrypted according to different products. An encryption method may be a combination of multiple encryption modes, such as Advanced Encryption System (AES) (advanced encryption standard in cryptography, a block encryption standard) and Message Digest Algorithm 5 (MD5) (one of HASH algorithms that generates 32 bit alphanumerical codes), so as to increase the secret level.

Only when the public key is decrypted with the private key stored in the EEPROM, and a new check code is generated to implement checking successfully, the credibility detection passes.

According to some implementation modes of the monitoring and control method for on-board trusted platform of the present disclosure, the method further includes that:

in response to the BMC code or the BIOS code not passing the credibility detection, the logic element controls the BMC not to enter the working state, and controls the PCH not to be powered, so as to stop a boot operation.

In some embodiments of the present disclosure, if the BMC code fails to be checked, the CPLD controls the RESET of the BMC not to be released, and controls the PCH not to be powered, namely the boot operation is stopped. If the BIOS code fails to be checked, the CPLD controls the RESET of the BMC not to be released, and controls the PCH not to be powered, namely the boot operation is stopped.

In some specific embodiments of the present disclosure, the first MUX and the second MUX connect the CPLD with the SPI FLASHes by default, namely the BMC and the PCH are disconnected from the corresponding serial storage modules. Therefore, after the device is powered on, the CPLD is connected with the serial storage modules first. Moreover, the power supply of the PCH is completely controlled by the CPLD.

First, in step 1, the server is plugged with an Alternating Current (AC) power line to power on the CPLD of a main board, and the CPLD starts reading the BMC code at a fixed position in the BMC serial storage module, and compares the BMC code with a key stored in the EEPROM for checking by means of an encryption algorithm.

In response to a failed checking, the CPLD controls the RESET of the BMC not to be released, and controls the PCH not to be powered, namely the boot operation is stopped. In response to a successful checking, step 2 is performed.

In step 2, the CPLD starts reading a fixed BIOS code in the BIOS serial storage module, and compares the BIOS code with a key stored in the EEPROM for checking by means of an encryption algorithm.

In response to the failed checking, the CPLD controls the RESET of the BMC not to be released, and controls the PCH not to be powered, namely the boot operation is stopped. In response to the successful checking, step 3 is performed.

In step 3, the CPLD controls the first MUX and the second MUX respectively to connect the PCH with the BIOS serial storage module and connect the BMC with the BMC serial storage module. The CPLD controls the power supply VR of the PCH to be powered on sequentially such that the PCH starts working. The CPLD controls the RESET of the BMC to be released such that the BMC starts working. Then, the server may be booted normally.

In some other embodiments, step 1 and step 2 are interchangeable in sequence. That is, the credibility detection is performed first on the BIOS code in the BIOS serial storage module and then on the BMC code in the BMC serial storage module, and then the subsequent step is performed.

Another aspect of the embodiments of the present disclosure also discloses an embodiment of a monitoring and control circuit for the on-board trusted platform. The circuit includes:

a BMC, connected to a BMC serial storage module by means of the first MUX;

a PCH, connected to a BIOS serial storage module by means of the second MUX; and the logic element, connected to the BMC serial storage module by means of the first MUX and to the BIOS serial storage module by means of the second MUX.

The logic element is configured to: in response to obtaining the power-on operation information of the server, obtain the BMC code in the BMC serial storage module and the BIOS code in the BIOS serial storage module, and perform the credibility detection on the BMC code and the BIOS code respectively according to a key; in response to that the BMC code passes the credibility detection, connect the first serial peripheral interface of the BMC to the BMC serial storage module by means of the first MUX; in response to that the BIOS code passes the credibility detection, connect a second serial peripheral interface of the PCH to the BIOS serial storage module by means of the second MUX; and control the PCH to be powered and the BMC to enter the working state.

According to some implementation modes of the monitoring and control circuit for the on-board trusted platform of the present disclosure, the control the PCH to be powered and the BMC to enter a working state further includes:

connecting the RESET pin of the BMC to the logic element, and controlling, by the logic element, the RESET pin of the BMC to be released to make the BMC enter the working state.

According to some implementation modes of the monitoring and control circuit for the on-board trusted platform of the present disclosure, the control the PCH to be powered and the BMC to enter a working state further includes:

connecting the power supply enable pin of the power supply chip that powers the PCH to the logic element, and controlling, by the logic element, the power supply enable pin to power the PCH.

According to some implementation modes of the monitoring and control circuit for the on-board trusted platform of the present disclosure, the logic element is further configured to:

in response to the logic element determining that the BMC code or the BIOS code does not pass the credibility detection, control the BMC not to enter the working state and the PCH not to be powered by the logic element, so as to stop the boot operation.

Another aspect of the embodiments of the present disclosure discloses an embodiment of the monitoring and control device for the on-board trusted platform. The device includes:

a connecting module, configured to connect, by means of a first MUX, the logic element and the BMC respectively to the BMC serial storage module that stores the BMC code, and connect, by means of a second MUX, the logic element and a PCH respectively to a BIOS serial storage module that stores the BIOS code;

a detection module, configured to, in response to that the logic element obtains the power-on operation information of the server, obtain the BMC code in the BMC serial storage module and the BIOS code in the BIOS serial storage module, and perform the credibility detection on the BMC code and the BIOS code respectively according to a key by the logic element;

a BMC code trusted module, configured to, in response to that the BMC code passes the credibility detection, control, the first MUX to connect a first serial peripheral interface of the BMC to the BMC serial storage module by the logic element;

a BIOS code trusted module, configured to, in response to that the BIOS code passes the credibility detection, control, the second MUX to connect a second serial peripheral interface of the PCH to the BIOS serial storage module by the logic element; and an enable module, configured to control the PCH to be powered and the BMC to enter a working state by the logic element.

The on-board trusted platform monitoring control solution may also be applied to other trusted platform detections and control application scenarios.

Similarly, it is to be understood by those skilled in the art that the all of the above implementation modes, features, and advantages described for the on-board trusted platform monitoring and control method according to the present disclosure are also suitable for the circuit and device according to the present disclosure. For brevity, repetitions are omitted herein.

It is to be particularly pointed out that the steps in each embodiment of the on-board trusted platform monitoring and control method, circuit, and device may be mutually intersected, replaced, added, and deleted. Therefore, these reasonable permutations, combinations, and transformations about the on-board trusted platform monitoring and control method, circuit, and device also fall within the scope of protection of the present disclosure, and the scope of protection of the present disclosure should not be limited to the embodiments.

It is finally to be noted that those ordinarily skilled in the art can understand that all or part of flows in the method of the above-mentioned embodiment may be completed by a computer program by instructing related hardware. The program for the on-board trusted platform monitoring and control method may be stored in a computer-readable memory medium. When the program is executed, the flows of each method embodiment may be included. The memory medium storing the program may be a magnetic disk, an optical disk, a Read-Only Memory (ROM), a Random Access Memory (RAM), etc. The embodiment of the computer program may have effects the same as or similar to those in any corresponding method embodiment.

In addition, the method disclosed according to the embodiments of the present disclosure may also be implemented as a computer program executed by a processor. The computer program may be stored in a computer-readable memory medium. When the computer program is executed by the processor, the functions defined in the method disclosed in the embodiments of the present disclosure are executed.

Moreover, each method step and system unit may also be implemented by a controller and a computer-readable memory medium configured to store a computer program enabling the controller to implement the steps or functions of the units.

Furthermore, it is to be understood that the computer-readable memory medium (such as a memory) herein may be a volatile memory or a nonvolatile memory, or may include both a volatile memory and a nonvolatile memory. As an example rather than a restriction, the nonvolatile memory may include a ROM, a Programmable ROM (PROM), an Electrically PROM (EPROM), an EEPROM, or a flash memory. The volatile memory may include a RAM that may be used as an external cache memory. As an example rather than a restriction, the RAM may be obtained in various forms, such as a Synchronous RAM (SRAM), a Dynamic RAM (DRAM), a Synchronous DRAM (SDRAM), a Double Data Rate SDRAM (DDRSDRAM), an Enhanced SDRAM (ESDRAM), a Synchronous Link DRAM (SLDRAM), and a Direct Rambus RAM (DR-RAM). The memory device in the disclosed aspect is intended to include, but not limited to, these or other proper types of memories.

It is also understood by those skilled in the art that various exemplary logic blocks, modules, circuits, and algorithm steps described in combination with the present disclosure herein may be implemented as electronic hardware, computer software, or a combination thereof. For ease of description about such interchangeability of hardware and software, functions of various schematic components, blocks, modules, circuits, and steps are described generally. Whether these functions are implemented as software or hardware depends on specific applications and design constraints on the whole system. Those skilled in the art may realize the functions for each specific application in various manners, but such realization should not be explained as resulting in departure from the scope disclosed in the embodiment of the present disclosure.

Various exemplary logic blocks, modules, and circuits described in combination with the present disclosure herein may be implemented or executed by the following components designed to execute the functions herein: a general-purpose processor, a Digital Signal Processor (DSP), an Application Specific Integrated Circuit (ASIC), a Field-Programmable Gate Array (FPGA) or another programmable logic device, a discrete gate or transistor logic, a discrete hardware component, or any combination thereof. The general-purpose processor may be a microprocessor. However, the processor may alternatively be any conventional processor, controller, microcontroller, or state machine. Alternatively, the processor may be implemented as a combination of computing devices, such as a combination of a DSP and a microprocessor, multiple microprocessors, a combination of one or more microprocessors and a DSP, and/or any other such configuration.

The steps of the method or algorithm described in combination with the present disclosure herein may be directly included in hardware, a software module executed by the processor, or a combination thereof. The software module may be located in a RAM, a flash memory, a ROM, an EPROM, an EEPROM, a register, a hard disk, a removable disk, a Compact Disc ROM (CD-ROM), or a memory medium of any other form well known in this art. The memory medium is exemplarily coupled to the processor such that the processor may read information from the memory medium or write information to the memory medium. In an alternative solution, the memory medium may be integrated with the processor. The processor and the memory medium may be located in an ASIC. The ASIC may be located in a user terminal. In an alternative solution, the processor and the memory medium may be located in a user terminal as discrete components.

In one or more exemplary designs, the function may be realized in hardware, software, firmware, or any combination thereof. If being realized in software, the function may be stored in a computer-readable medium or transmitted through the computer-readable medium as one or more instructions or codes. The computer-readable medium includes a computer memory medium and a communication medium. The communication medium includes any medium that helps to transmit a computer program from one position to another. The memory medium may be any available medium accessible for a general-purpose or special-purpose computer. As an example rather than a restriction, the computer-readable medium may include a RAM, a ROM, an EEPROM, a CD-ROM or another optical disc memory device, a disk memory device or another magnetic memory device, or any other medium available for carrying or storing a needed program code in form of an instruction or a data structure and accessible for a general-purpose or special-purpose computer or a general-purpose or special-purpose processor. In addition, any connection may be referred to as a computer-readable medium as appropriate. For example, if a coaxial cable, a fiber optic cable, a twisted pair, a Digital Subscriber Line (DSL), or a wireless technology like infrared, radio, and microwave is used to send software from a website, a server, or another remote source, the coaxial cable, the fiber optic cable, the twisted pair, the DSL, or the wireless technology like infrared, radio, and microwave is included in the definition of the medium. As used herein, the magnetic disk and the optical disc include a Compact Disc (CD), a laser disc, an optical disc, a Digital Versatile Disc (DVD), a floppy disc, and a blue-ray disc. Generally, the magnetic disk magnetically reproduces data, while the optical disc optically reproduces data using laser. Combinations of the above-mentioned contents should also be included in the scope of the computer-readable medium.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively.

The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a program by instructing related hardware. The program may be stored in a computer-readable memory medium. The above-mentioned memory medium may be a ROM, a magnetic disk, an optical disk, or the like.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

The invention claimed is:

1. A monitoring and control method for an on-board trusted platform, wherein the method is implemented through a monitoring and control circuit for the on-board trusted platform, and the monitoring and control circuit comprises:
 a logic element;
 a Baseboard Management Controller (BMC);
 a Platform Controller Hub (PCH);
 a BMC serial storage module configured to store a BMC code and a first private key;
 a Basic Input Output System (BIOS) serial storage module configured to store a BIOS code and a second private key;
 a first Multiplexer (MUX), controlled by the logic element, wherein the first MUX is configured to connect the BMC to the BMC serial storage module, or connect the logic element to the BMC serial storage module; and
 a second MUX, controlled by the logic element, wherein the second MUX is configured to connect the PCH to the BIOS serial storage module, or connect the logic element to the BIOS serial storage module;
wherein method comprises:
 connecting, by means of the first MUX, the logic element and the BMC respectively to the BMC serial storage module that stores the BMC code, and connecting, by means of the second MUX, the logic element and the PCH respectively to the BIOS serial storage module that stores the BIOS code;
 in response to the logic element obtaining power-on operation information of a server, obtaining, by the logic element, the BMC code in the BMC serial storage module and the BIOS code in the BIOS serial storage module, and performing, by the logic element, a credibility detection on the BMC code according to the first private key and the BIOS code according to the second private key;
 in response to the BMC code passing the credibility detection, controlling, by the logic element, the first MUX to connect a first serial peripheral interface (SPI) of the BMC to the BMC serial storage module;
 in response to the BIOS code passing the credibility detection, controlling, by the logic element, the second MUX to connect a second SPI of the PCH to the BIOS serial storage module; and
 controlling the PCH to be powered and the BMC to enter a working state by the logic element;
wherein the performing a credibility detection on the BMC code according to the first private key and the BIOS code according to the second private key further comprises:
 encrypting a plurality of pieces of preset BMC code information in the BMC code to form a BMC code public key, performing a decryption checking on the BMC code public key by means of the first private key, and in response to the decryption checking being successful, determining that the BMC code passes the credibility detection; and
 encrypting a plurality of pieces of preset BIOS code information in the BIOS code to form a BIOS code public key, performing the decryption checking on the BIOS code public key by means of the second private key, and in response to the decryption checking being successful, determining that the BIOS code passes the credibility detection.

2. The monitoring and control method for the on-board trusted platform according to claim 1, wherein the controlling the PCH to be powered and the BMC to enter a working state by the logic element further comprises:

connecting a RESET pin of the BMC to the logic element, and controlling, by the logic element, the RESET pin of the BMC to be released to make the BMC enter the working state.

3. The monitoring and control method for the on-board trusted platform according to claim 1, wherein the controlling the PCH to be powered and the BMC to enter a working state by the logic element further comprises:

connecting a power supply enable pin of a power supply chip that powers the PCH to the logic element, and controlling, by the logic element, the power supply enable pin to power the PCH.

4. The monitoring and control method for the on-board trusted platform according to claim 1, further comprising:

in response to the BMC code or the BIOS code not passing the credibility detection, controlling the BMC not to enter the working state and the PCH not to be powered by the logic element, so as to stop a boot operation.

5. The monitoring and control method for the on-board trusted platform according to claim 1, wherein each of the BMC serial storage module and the BIOS serial storage module comprises a protected area, and the first private key and the second private key are respectively stored in the protected area.

6. A monitoring and control circuit for an on-board trusted platform, comprising:

a logic element;

a Baseboard Management Controller (BMC);

a Platform Controller Hub (PCH);

a BMC serial storage module configured to store a BMC code and a first private key;

a Basic Input Output System (BIOS) serial storage module configured to store a BIOS code and a second private key;

a first Multiplexer (MUX), controlled by the logic element, wherein the first MUX is configured to connect the BMC to the BMC serial storage module, or connect the logic element to the BMC serial storage module; and a second MUX, controlled by the logic element, wherein the second MUX is configured to connect the PCH to the BIOS serial storage module, or connect the logic element to the BIOS serial storage module;

wherein the logic element is configured to:

in response to obtaining power-on operation information of a server, obtain the BMC code in the BMC serial storage module and the BIOS code in the BIOS serial storage module, and perform a credibility detection on the BMC code according to the first private key and the BIOS code according to the second private key;

in response to the BMC code passing the credibility detection, connect a first serial peripheral interface (SPI) of the BMC to the BMC serial storage module by means of the first MUX;

in response to the BIOS code passing the credibility detection, connect a second SPI of the PCH to the BIOS serial storage module by means of the second MUX; and control the PCH to be powered and the BMC to enter a working state;

wherein the logic element is further configured to:

encrypt a plurality of pieces of preset BMC code information in the BMC code to form a BMC code public key, perform a decryption checking on the BMC code public key by means of the first private key, and in response to the decryption checking being successful, determine that the BMC code passes the credibility detection; and encrypt a plurality of pieces of preset BIOS code information in the BIOS code to form a BIOS code public key, perform the decryption checking on the BIOS code public key by means of the second private key, and in response to the decryption checking being successful, determine that the BIOS code passes the credibility detection.

7. The monitoring and control circuit for the on-board trusted platform according to claim 6, wherein the control the PCH to be powered and the BMC to enter a working state further comprises:

connecting a RESET pin of the BMC to the logic element, and controlling, by the logic element, the RESET pin of the BMC to be released to make the BMC enter the working state.

8. The monitoring and control circuit for the on-board trusted platform according to claim 6, wherein the control the PCH to be powered and the BMC to enter a working state further comprises:

connecting a power supply enable pin of a power supply chip that powers the PCH to the logic element, and controlling, by the logic element, the power supply enable pin to power the PCH.

9. The monitoring and control circuit for the on-board trusted platform according to claim 6, wherein the logic element is further configured to:

in response to the logic element determining that the BMC code or the BIOS code does not pass the credibility detection, control the BMC not to enter the working state and the PCH not to be powered by the logic element, so as to stop a boot operation.

10. The monitoring and control circuit for the on-board trusted platform according to claim 6, wherein each of the BMC serial storage module and the BIOS serial storage module comprises a protected area, and the first private key and the second private key are respectively stored in the protected area.

11. A monitoring and control method for an on-board trusted platform, comprising:

connecting, by means of a first Multiplexer (MUX), a logic element and a Baseboard Management Controller (BMC) respectively to a BMC serial storage module that stores a BMC code and a first private key, and connecting, by means of a second MUX, the logic element and a Platform Controller Hub (PCH) respectively to a Basic Input Output System (BIOS) serial storage module that stores a BIOS code and a second private key;

in response to the logic element obtaining power-on operation information of a server, obtaining, by the logic element, the BMC code in the BMC serial storage module and the BIOS code in the BIOS serial storage module, and performing, by the logic element, a credibility detection on the BMC code according the first private key stored in the BMC serial storage module and the credibility detection on the BIOS code according to the second private key stored in the BIOS serial storage module;

in response to the BMC code passing the credibility detection according to the first private key, controlling, by the logic element, the first MUX to connect a first serial peripheral interface (SPI) of the BMC to the BMC serial storage module;

in response to the BIOS code passing the credibility detection according to the second private key, controlling, by the logic element, the second MUX to connect a second SPI of the PCH to the BIOS serial storage module; and controlling the PCH to be powered and the BMC to enter a working state by the logic element;

wherein the performing, by the logic element, a credibility detection on the BMC code according the first private key stored in the BMC serial storage module and the credibility detection on the BIOS code according to the second private key stored in the BIOS serial storage module further comprises:

encrypting a plurality of pieces of preset BMC code information in the BMC code to form a BMC code public key, performing a decryption checking on the BMC code public key by means of the first private key, and in response to the decryption checking being successful, determining that the BMC code passes the credibility detection; and encrypting a plurality of pieces of preset BIOS code information in the BIOS code to form a BIOS code public key, performing the decryption checking on the BIOS code public key by means of the second private key, and in response to the decryption checking being successful, determining that the BIOS code passes the credibility detection.

12. The monitoring and control method for the on-board trusted platform according to claim 11, wherein the controlling the PCH to be powered and the BMC to enter a working state by the logic element further comprises:

connecting a RESET pin of the BMC to the logic element, and controlling, by the logic element, the RESET pin of the BMC to be released to make the BMC enter the working state.

13. The monitoring and control method for the on-board trusted platform according to claim 11, wherein the controlling the PCH to be powered and the BMC to enter a working state by the logic element further comprises:

connecting a power supply enable pin of a power supply chip that powers the PCH to the logic element, and controlling, by the logic element, the power supply enable pin to power the PCH.

14. The monitoring and control method for the on-board trusted platform according to claim 11, further comprising:

in response to the BMC code or the BIOS code not passing the credibility detection, controlling the BMC not to enter the working state and the PCH not to be powered by the logic element, so as to stop a boot operation.

15. The monitoring and control method for the on-board trusted platform according to claim 11, wherein each of the BMC serial storage module and the BIOS serial storage module comprises a protected area, and the first private key and the second private key are respectively stored in the protected area.

* * * * *